Figure 2:
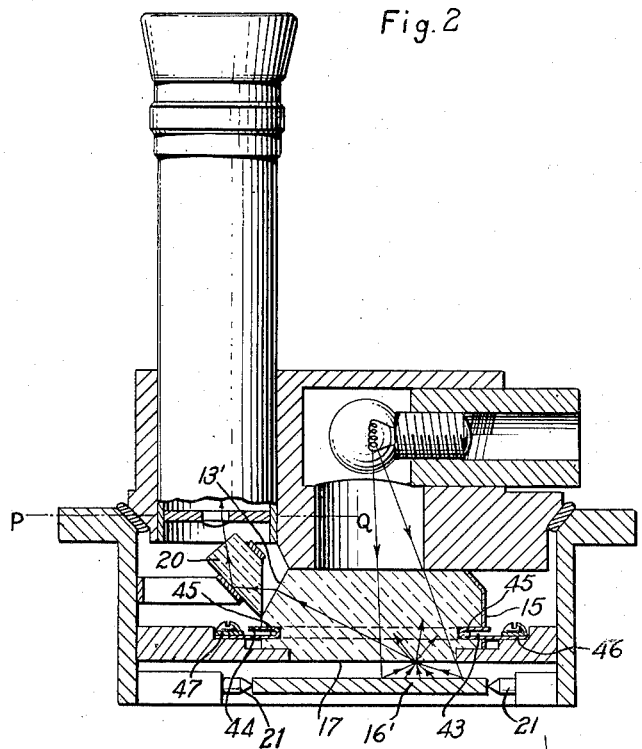

Oct. 30, 1956  E. GOLDBERG ET AL  2,768,553

REFRACTOMETERS

Filed Aug. 20, 1951

INVENTOR:
Emanuel Goldberg
BY
Richards Geier
ATTORNEYS

United States Patent Office 2,768,553
Patented Oct. 30, 1956

2,768,553

REFRACTOMETERS

Emanuel Goldberg, Tel-Aviv, Israel, and Herbert E. Goldberg, West Simsbury, Conn.

Application August 20, 1951, Serial No. 242,608

8 Claims. (Cl. 88—14)

This invention relates to refractometers.

Various kinds of refractometers are known for both laboratory and industrial use. Most of them are based on the measurement of the angle of total reflection of light. They have the common drawback that the contrast between the bright and dark portions of the field of vision is not very marked. Since the refractometric measurement consists in reading the position of the dividing line between the bright and dark portions relative to a scale provided in the telescope part of the instrument the exactness of the readings has not been so great, and the applicability of refractometers not so universal, as the soundness of the underlying principle and the precision of construction of these instruments would have warranted. For example, it has virtually not been possible so far to build refractometers of this type into the wall of pipes, chemical reaction vessels, concentrating or other apparatus for the current testing without sampling of the fluid contained therein or passing therethrough.

This invention has the object to provide refractometers that are free from the drawback aforesaid, thereby increasing the exactness of measurements made therewith and widening the range of applicability of the instruments.

It is, of course, known that light must not enter the refractometer prism otherwise than along the path provided for the purpose in each particular construction. This is prevented thereby that the "function-less" surfaces of the refractometer prism, that is, those serving neither as interfaces with the fluid to be tested, nor for the transmission of light from the source of light (where this enters the prism primarily through a surface other than the aforesaid interface), nor for the transmission of the light to the telescope, are covered, as a rule, by parts of the casing of the instruments.

The present invention is based on the new and surprising observation that the lack of contrast between the portions of the field of vision is due to parasitic light entering the telescope from the prism in spite of the aforesaid covering-up of the function-less prism surfaces, and that such parasitic light is produced thereby that light originally entering the prism in the regular way is reflected along parasitic paths within the prism by reflection on one, several or all of the function-less surfaces of the prism, and at least a part of the rays thus reflected is thrown into the telescope.

Accordingly, the invention consists in refractometers wherein one, more or all of the function-less surfaces (as herein defined) of the refractometer prism are rendered non-reflecting.

The said functionless surfaces are rendered non-reflecting by covering them directly, i. e. without even the smallest intervening gap or air film with a dark layer that absorbs virtually all the light impinging on the said surfaces from within the prism.

The result is that the contrast between the bright and dark portions of the field of vision of the refractometer telescope is greatly enhanced. As a consequence, the exactness of the measurements is considerably increased and refractometry can now be extended to fields of application hitherto virtually denied to it. This extension of the applicability of refractometry brings in its wake the construction of new types of refractometer, some of which will be described hereinafter as forming equally part of the present invention.

Figure 1:
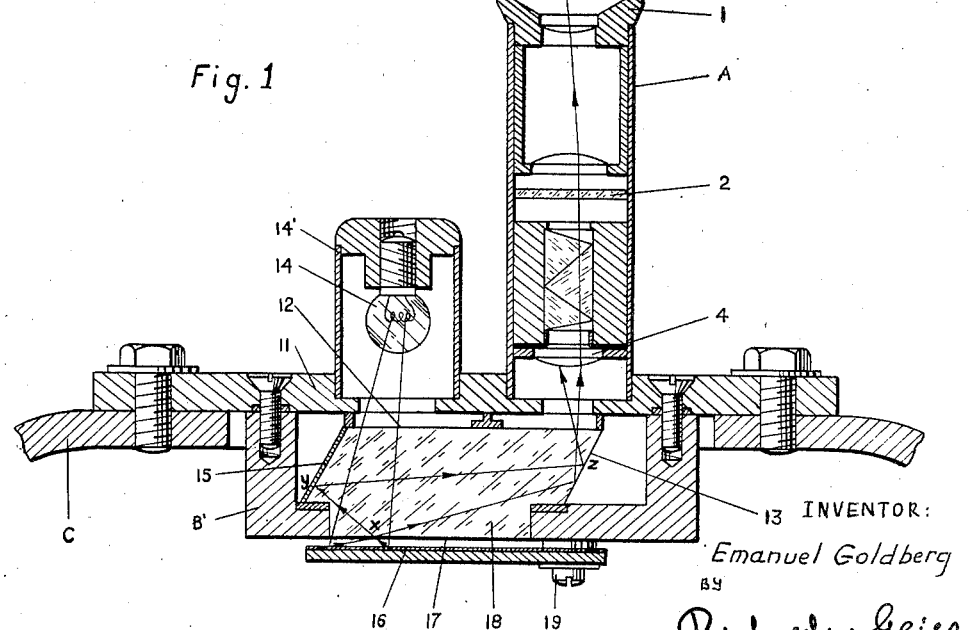

The invention is illustrated, by way of example only, in the accompanying drawings in which:

Figs. 1 and 2 show in axial section two different built-in refractometers according to the invention.

Fig. 1 shows a built-in refractometer in accordance with the present invention. This comprises a base plate 11 adapted to be mounted in the wall C of a vessel in which a process to be kept under current supervision takes place, or in a pipe, or at any place where it is desired to be able to test at any time a fluid without having to take out a sample thereof. The base plate carries the telescope casing A which projects outwardly, and the prism casing B' which projects inwardly into the vessel or pipe. The prism 18 has quadrangular cross section, two sides 12 and 17 (the latter constituting the interface) being parallel. At two opposite ends of surface 17 the prism is rabbeted for jointing with the casing B' whose outer face is flush with the surface 17. Opposite to the surface 12 of the prism, a source of light, e. g. an electric bulb 14, is enclosed in a casing 14' mounted on the base plate 11. The light from this source passes through surfaces 12 and 17 of the prism and falls on a light diffusing surface 16 arranged at a small distance from the surface 17 so that the fluid to be tested can spread in or flow through the narrow gap between the two surfaces.

The light reflected from surface 16 re-enters the prism through the interface 17 which thus becomes a secondary-light admission surface and from which a substantial part of the light goes to the surface 13 of the prism where it is reflected into the telescope. In the construction here shown the inclination or surface 13 is so calculated that the light leaves the prism substantially at right angles to surfaces 17 and 12, but the surface 13 may instead be given a different inclination in order to provide, by subsequent refraction on surface 12, partial or complete correction for the colour dispersion occurring on surface 17, where this appears to be desirable. The reflection on surface 13 may either be by way of total reflection, or by means of a reflecting coating on surface 13, e. g. silver or aluminium. This, then, is the regular light path.

In addition thereto, some light enters the prism through surface 17 in other directions and goes to the function-less surface 15 opposite surface 13, and a portion of it would go along the path x—y—z and be able to enter the telescope as parasitic light. This is prevented by making the surface 15 non-reflecting in the manner described above.

If the refractometer is destined for use in connection with a viscous liquid it is advantageous to put the surface 16 on a plate movable relative to the interface, for example, pivotable about an axle 19. Or else, the plate may be arranged for movement parallel to its own plane. Instead, or in addition to, the possibility of moving the plate carrying the surface 16 it would be possible to provide a wiper 49 similar to a wind-shield wiper, for sweeping the interface. Control means 50 will be provided for the movements of the plate or wiper so as to allow to actuate them from outside.

No light-diffusing surface 16 is needed at all in such cases where the liquid to be tested is sufficiently turbid to reflect itself the amount of diffused light needed for the measurement. This applies, for example, to the refractometry of citrus juice concentrates in the process of concentration.

Fig. 2 illustrates a refractometer that is similar in principle to the one shown in Fig. 1 but differs therefrom in some respects. The principal difference is that the regular path of the light includes a prism or wedge 20 which throws the light into the telescope after it has left the prism through the surface 13'. The latter may be designed to provide complete or partial correction for the colour dispersion occurring on surface 17. This prism may also be replaced by a mirror if colour correction is not necessary, or is provided for otherwise. A minor difference is in the mounting of plate 16' carrying the light-diffusing surface, which is rotatable about an axis represented by pins 21. Another difference between this embodiment of the invention and that illustrated in Fig. 1 lies in the construction of the seal between the main refractometer prism and the body of the instrument. Connecting grooves 43 have been milled into all four sides of the prism. A piece of thin rubber tubing 44, similar to bicycle tubing, has been placed around the prism and drawn into the groove 43 by tightening a wire ring 45 placed over it. The seal between the rubber and the glass prism which has thus been secured, can be improved by placing a suitable bonding cement or resin between them. The rim 46 of the rubber flange thus formed is attached to the instrument body by conventional means such as a pressure ring 47 secured by screws with or without the use of bonding cement. The rubber tube may be replaced by a thin metal or plastic ring of rectangular section which is cemented into the groove 43 and the outer rim of which is fastened to the instrument body. Yet other minor differences between this embodiment of the invention and the one illustrated in Fig. 1 can be seen from the drawings and are mere constructional details which do not require description.

I claim:

1. A refractometer comprising a casing, a telescope mounted on said casing for the observation of refracted light passing through said casing, a testing prism within said casing and having an interface, one surface of the prism being exposed to the medium to be tested and arranged to receive refracted light from said medium, a source of light mounted on said casing and located at a point separated by a part of the prism from said exposed surface, said prism having at least one surface inside the casing located outside the direct path of the light emitted from said source and being directly covered with a layer adapted to absorb light impinging thereon from inside the prism, the path of light extending from the source of light through the prism to the interface of the latter with the medium to be tested, out of the interface into the medium back from the medium through the interface and through the prism to the telescope.

2. A refractometer as claimed in claim 1, wherein the source of light and telescope are located in front of one and the same surface of the prism substantially opposite the interface, and means are provided for preventing direct passage of light from the source of light to the telescope.

3. A refractometer as claimed in claim 1, wherein the source of light and telescope are located in front of different surfaces of the prism, the former in front of a surface substantially opposite the interface and the telescope in front of a surface including an angle with the interface.

4. A refractometer as claimed in claim 1, comprising a gasket within the casing for preventing the access of medium from the interface of the prism into the casing.

5. A refractometer as claimed in claim 1, wherein the casing includes a mounting plate adapted to be mounted on the wall of a vessel containing the medium to be tested for allowing refractometering thereof without withdrawing a sample.

6. A refractometer as claimed in claim 1, wherein the casing includes a mounting plate adapted to be mounted on the wall of a vessel containing the medium to be tested, said refractometer further comprising a wiper in conjunction with an interface and adapted to clean the latter, and means for actuating the wiper from outside said vessel.

7. A refractometer comprising a casing, a telescope mounted on said casing for the observation of refracted light passing through said casing, a testing prism within said casing and having an interface, the surface of the prism being exposed to the medium to be tested, a source of light mounted on the casing and located at a point separated by a part of the prism from said exposed surface, a surface adapted to diffuse light in front of said interface at a distance therefrom and to direct diffused light through said medium on to said interface; at least one surface of the prism inside the casing being located outside of the direct beam of the light emitted from said source of light and directly covered with a layer adapted to absorb light impinging thereon from inside the prism.

8. A refractometer as claimed in claim 7, wherein the said light diffusing surface in front of the interface is adapted to be displaced relatively to the latter.

References Cited in the file of this patent

UNITED STATES PATENTS

| | | |
|---|---|---|
| 574,588 | Thorp | Jan. 5, 1897 |
| 1,481,917 | Lowe | Jan. 29, 1924 |
| 1,601,597 | Peacock | Sept. 28, 1926 |
| 2,023,558 | Tallman | Dec. 10, 1935 |
| 2,244,245 | Ehrenberg | June 3, 1941 |
| 2,305,777 | Hansen et. al. | Dec. 22, 1942 |
| 2,383,347 | Silge | Aug. 21, 1945 |
| 2,387,581 | Hansen | Oct. 23, 1945 |
| 2,391,599 | Silge | Dec. 25, 1945 |
| 2,394,949 | Straat | Feb. 12, 1946 |
| 2,447,828 | West | Aug. 24, 1948 |
| 2,502,913 | Arnulf | Apr. 4, 1950 |
| 2,569,127 | Eltenton | Sept. 25, 1951 |

FOREIGN PATENTS

| | | |
|---|---|---|
| 9,308 | Great Britain | of 1899 |